(12) United States Patent
Komatsu et al.

(10) Patent No.: US 9,759,319 B2
(45) Date of Patent: Sep. 12, 2017

(54) TRAVELING WORK VEHICLE

(71) Applicant: KUBOTA CORPORATION, Osaka (JP)

(72) Inventors: Shigeru Komatsu, Osaka (JP); Keiji Takahashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 325 days.

(21) Appl. No.: 14/636,711

(22) Filed: Mar. 3, 2015

(65) Prior Publication Data

US 2016/0033033 A1    Feb. 4, 2016

(30) Foreign Application Priority Data

Aug. 1, 2014 (JP) .................................. 2014-157697

(51) Int. Cl.
*B60W 10/04* (2006.01)
*F16H 61/684* (2006.01)
(Continued)

(52) U.S. Cl.
CPC ........... *F16H 61/684* (2013.01); *B60K 35/00* (2013.01); *F16H 37/043* (2013.01); *F16H 59/02* (2013.01);
(Continued)

(58) Field of Classification Search
CPC .. F16H 61/684; F16H 61/702; F16H 59/0217; F16H 37/043; F16H 61/682;
(Continued)

(56) References Cited

U.S. PATENT DOCUMENTS 5,301,564 A    4/1994 Muller et al.
5,666,793 A    9/1997 Bottinger
(Continued)

FOREIGN PATENT DOCUMENTS

EP    2 277 736    1/2011
EP    2 428 385    3/2012
(Continued)

OTHER PUBLICATIONS

Search Report issued by Europeant patent office in Europeant Patent Application No. 15158042.0, dated Jan. 11, 2016.
(Continued)

*Primary Examiner* — David J Hlavka
(74) *Attorney, Agent, or Firm* — Greenblum & Bernstein, P.L.C.

(57) ABSTRACT

A traveling work vehicle includes a gear-shifting control unit that outputs a gear-shifting control command to a main gear-shifting apparatus for shifting gears without cutting off power transmission, a sub gear-shifting apparatus for shifting gears by cutting off power transmission, and a first operation unit and a second operation unit that provide gear-shifting, upshifting or downshifting, operation commands to the gear-shifting control unit. The gear-shifting control unit has a first travel control section that generates a gear-shifting control command for shifting gears in the main gear-shifting apparatus in response to the gear-shifting operation command from the first operation unit in a work traveling mode, and a second travel control section that generates a gear-shifting control command for shifting gears in the sub gear-shifting apparatus in response to the gear-shifting operation command from the second operation unit in the work traveling mode.

14 Claims, 10 Drawing Sheets

(51) Int. Cl.
*F16H 61/682* (2006.01)
*F16H 59/02* (2006.01)
*F16H 63/42* (2006.01)
*B60K 35/00* (2006.01)
*F16H 61/70* (2006.01)
*F16H 37/04* (2006.01)

(52) U.S. Cl.
CPC ..... *F16H 59/0217* (2013.01); *F16H 59/0278* (2013.01); *F16H 61/682* (2013.01); *F16H 61/702* (2013.01); *F16H 63/42* (2013.01); *B60Y 2200/221* (2013.01); *F16H 2063/426* (2013.01)

(58) Field of Classification Search
CPC ................ F16H 59/02; F16H 59/0278; F16H 2063/426; B60K 35/00
See application file for complete search history.

(56) References Cited

U.S. PATENT DOCUMENTS 8,328,676 B2   12/2012   Legner

| | | |
|---|---|---|
| 2003/0134712 A1 | 7/2003 | Katou et al. |
| 2008/0214351 A1* | 9/2008 | Katayama ............... F16H 47/04 475/296 |
| 2009/0270212 A1* | 10/2009 | Ueda ....................... F16H 47/04 475/74 |
| 2014/0238757 A1* | 8/2014 | Sagawa .................. B60K 17/28 180/53.6 |

FOREIGN PATENT DOCUMENTS

| | | |
|---|---|---|
| GB | 2 446 958 | 8/2008 |
| JP | 08-258583 | 10/1996 |
| JP | 2001-355723 | 12/2001 |
| JP | 2008-057674 | 3/2008 |
| JP | 2009-214877 | 9/2009 |
| JP | 2012-132529 | 7/2012 |

OTHER PUBLICATIONS

Japanese Office Action issued in Counterpart Patent Appl. No. 2014-157697, dated Jun. 27, 2017.

* cited by examiner

Fig.9

| | | Main gear-shifting operation | | | | Sub gear-shifting operation | |
|---|---|---|---|---|---|---|---|
| | | Road traveling | | Work traveling | | | |
| Gear stage before operation | | Gear stage after operation | | Gear stage after operation | | Gear stage after operation | |
| Main gear-shifting | Sub gear-shifting | UP | DN | UP | DN | UP | DN |
| A | 1 | A-2 | | A-2 | | B-1 | |
| | 2 | A-3 | A-1 | A-3 | A-1 | B-1 | |
| | 3 | A-4 | A-2 | A-4 | A-2 | B-1 | |
| | 4 | B-1 | A-3 | | A-3 | B-1 | |
| B | 1 | B-2 | A-4 | B-2 | | C-1 | A-4 |
| | 2 | B-3 | B-1 | B-3 | B-1 | C-1 | A-4 |
| | 3 | B-4 | B-2 | B-4 | B-2 | C-1 | A-4 |
| | 4 | C-2 | B-3 | | B-3 | C-2 | A-4 |
| C | 1 | C-2 | B-3 | C-2 | | D-1 | B-3 |
| | 2 | C-3 | C-1 | C-3 | C-1 | D-1 | B-4 |
| | 3 | C-4 | C-2 | C-4 | C-2 | D-1 | B-4 |
| | 4 | D-2 | C-3 | | C-3 | D-2 | B-4 |
| D | 1 | D-2 | C-3 | D-2 | | E-1 | C-3 |
| | 2 | D-3 | D-1 | D-3 | D-1 | E-1 | C-4 |
| | 3 | D-4 | D-2 | D-4 | D-2 | E-1 | C-4 |
| | 4 | E-3(E-2) | D-3 | | D-3 | E-3(E-2) | C-4 |
| E | 1 | E-2 | D-2(D-3) | E-2 | | F-1 | D-2(D-3) |
| | 2 | E-3 | E-1 | E-3 | E-1 | F-1 | D-3(D-4) |
| | 3 | E-4 | E-2 | E-4 | E-2 | F-1 | D-4 |
| | 4 | F-1 | E-3 | | E-3 | F-2 | D-4 |
| F | 1 | F-2 | E-4 | F-2 | | | E-3 |
| | 2 | F-3 | F-1 | F-3 | F-1 | | E-4 |
| | 3 | F-4 | F-2 | F-4 | F-2 | | E-4 |
| | 4 | | F-3 | | F-3 | | E-4 |

TRAVELING WORK VEHICLE

FIELD OF THE INVENTION

The present invention relates to a traveling work vehicle that includes a gear-shifting control unit configured to create multiple types of vehicle gear ratios by combining multiple gear stages included in a main gear-shifting apparatus and multiple gear stages included in a sub gear-shifting apparatus.

BACKGROUND

With traveling work vehicles such as tractors, gear-shifting control units that create 20 or more vehicle gear ratios by combining a main gear-shifting apparatus and a sub gear-shifting apparatus in order to obtain speeds (vehicle speeds) that are suitable for various types of work traveling and road traveling have also become widespread. In such a case, the gear-shifting operation method for the main gear-shifting apparatus and the method for the sub gear-shifting apparatus are different, and there are known to be vehicles in which a main gear-shifting operation lever and a sub gear-shifting operation lever are included separately, and vehicles in which an operation button that enables a gear-shifting operation of one gear-shifting apparatus is provided on an operation lever for the other gear-shifting apparatus.

For example, JP 2008-57674A discloses a work vehicle that includes a main gear-shifting apparatus having eight gear stages, and a sub gear-shifting apparatus having three gear stages. With the main gear-shifting apparatus, the gear stage of the main gear-shifting apparatus is determined using a main gear-shifting lever that can be operated to gear shift positions for a first gear stage to an eighth gear stage. With the sub gear-shifting apparatus, the gear stage of the sub gear-shifting apparatus is determined using a sub gear-shifting lever that can be operated to three gear shift positions. The operation position of the main gear-shifting lever is displayed on a display portion divided into seven segments, and thus the driver can set the desired gear stage out of the eight gear stages while viewing the display portion.

Furthermore, JP 2009-214877A discloses an agricultural tractor that includes a main gear-shifting apparatus that obtains eight gear stages by combining a first main gear-shifting apparatus with four gear stages and a second main gear-shifting apparatus with two gear stages, and a sub gear-shifting apparatus that is capable of three-stage gear shifting. When the sub gear-shifting apparatus is operated, a main clutch engagement/disengagement operation is needed, and therefore a main clutch pedal is stepped on, the operation lever is operated in a front-rear direction or a left-right direction, and the main clutch pedal is released after the gear-shifting operation. Also, regarding the main gear-shifting apparatus, gear shifting is performed by pressing an upshift switch and a downshift switch provided on a nob of the operation lever. In other words, by pressing an upshift switch 37 in sequence from a first gear stage, gear shifting to an eighth gear stage is achieved one gear stage at a time. Conversely, by pressing a downshift switch for the main gear-shifting apparatus at the position for the eighth gear stage in sequence, it is possible to downshift from the eighth gear stage to the first gear stage. The display of the selected gear stage is performed via a liquid crystal display portion arranged on a gauge panel. The gear shift position of the sub gear-shifting apparatus is displayed in the upper left portion of the liquid crystal display panel, and the gear shift position of the main gear-shifting apparatus is displayed as a mirror image on the right side thereof.

SUMMARY OF THE INVENTION

With a traveling work vehicle such as that described above, multiple gear stages are obtained by combining a main gear-shifting apparatus and a sub gear-shifting apparatus, but in order to realize smooth work traveling, it is necessary to set an appropriate gear stage. For this reason, a traveling work vehicle is desired which realizes smooth work traveling by appropriately selecting multiple gear stages obtained by combining the main gear-shifting apparatus and the sub gear-shifting apparatus.

The traveling work vehicle according to the present invention includes: a main gear-shifting apparatus configured to perform gear stage switching that is not accompanied by a cutoff of power transmission; a sub gear-shifting apparatus configured to perform gear stage switching that is accompanied by a cutoff of power transmission; a gear-shifting control unit configured to output a gear-shifting control command to the main gear-shifting apparatus and the sub gear-shifting apparatus so as to create a vehicle gear ratio according to a combination of gear stages of the main gear-shifting apparatus and the sub gear-shifting apparatus; and a first operation unit and a second operation unit configured to provide a gear-shifting operation command for upshifting and a gear-shifting operation command for downshifting to the gear-shifting control unit. Furthermore, the gear-shifting control unit includes a first travel control section configured to, in a work traveling mode, generate a gear-shifting control command for performing only switching of the gear stage of the main gear-shifting apparatus in response to a gear-shifting operation command from the first operation unit, and a second travel control section configured to generate the gear-shifting control command accompanied by switching of the gear stage of the sub gear-shifting apparatus in response to a gear-shifting operation command from the second operation unit.

According to this configuration, if a gear-shifting operation is performed using the first operation unit, only switching of the gear stage of the main gear-shifting apparatus is performed in which the gear stage is switched without being accompanied by a cutoff of power transmission, and therefore the power transmission from the engine to the drive wheels is not cut off during gear shifting. For this reason, even when performing tilling work traveling or hauling work traveling, which is accompanied by a large load, if only gear shift operations using the first operation unit are performed, a shock caused by rapid downshifting or the like can be avoided. Also, if there is a change in the status of the work site or in the work status and the gear stage of the sub gear-shifting apparatus needs to be switched, it is sufficient to perform a gear-shifting operation using the second operation unit. If the gear stage of the sub gear-shifting apparatus that is suitable for the work that is to be performed is selected in advance, smooth work traveling is realized with a gear-shifting operation in which only the first operation unit is used.

BRIEF DESCRIPTION OF THE DRAWINGS

FIG. 9 is a gear stage switching table showing gear stages for a main gear-shifting apparatus and a sub gear-shifting apparatus resulting from gear-shifting operations.

DETAILED DESCRIPTION

Figure 1:
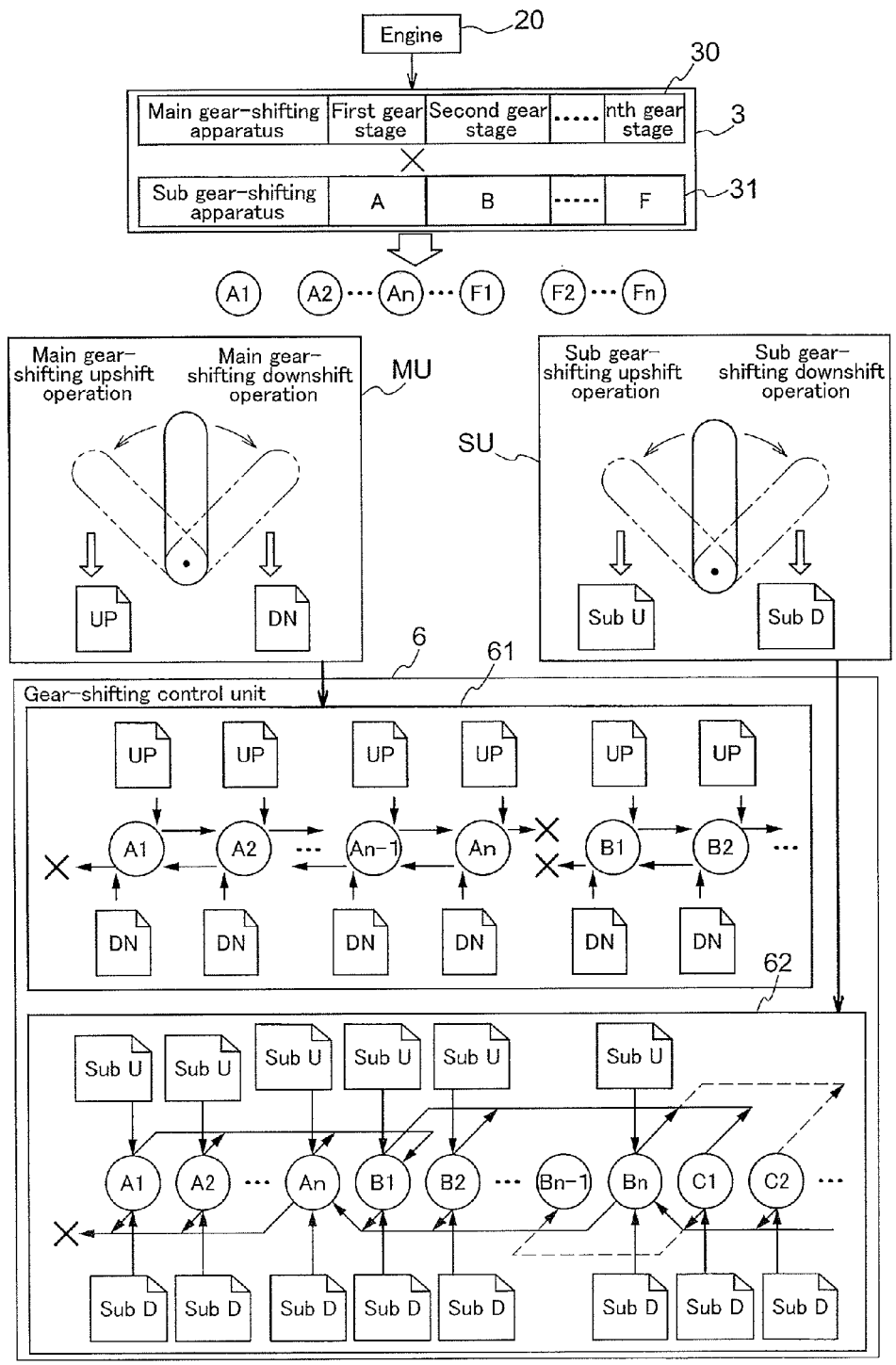
FIG. 1 is a schematic diagram for illustrating a basic principle of gear-shifting control according to the present invention.

Before specific embodiments of the traveling work vehicle according to the present invention are described, a basic principle of gear-shifting control that characterizes the present invention will be described with reference to FIG. 1. The traveling work vehicle according to the present invention includes a transmission 3 that converts power from the engine 20 and transmits it to drive wheels. The transmission 3 includes a main gear-shifting apparatus 30 and a sub gear-shifting apparatus 31. The main gear-shifting apparatus 30 is of a type that performs gear stage switching that is not accompanied by a cutoff of power transmission, and the sub gear-shifting apparatus 31 is of a type that performs gear stage switching that is accompanied by a cutoff of the power transmission. Hereinafter, the basics of control for switching to a gear stage, or so-called "gear-shifting control" in the main gear-shifting apparatus 30 and the sub gear-shifting apparatus 31 will be described with reference to FIG. 1. Here, the main gear-shifting apparatus 30 has 1 to n gear stages (n is a natural number but normally refers to a numeric value from around 4 to 8). The sub gear-shifting apparatus 31 has A to F gear stages (the symbols A to F are used to identify the gear stages and are not intended to restrict the number of gear stages, and the number of gear stages is normally around two to eight). One vehicle gear ratio is created by combining the gear stage selected by the main gear-shifting apparatus 30 and the gear stage selected by the sub gear-shifting apparatus 31. In FIG. 1, this combined gear stage is shown using a combination of the gear stage numeric value (natural number) of the main gear-shifting apparatus 30 and the gear stage symbol (letter).

The driver operates a first operation unit MU in order to switch the gear stage of the main gear-shifting apparatus 30, and operates a second operation unit SU in order to switch the gear stage of the sub gear-shifting apparatus 31. The first operation unit MU and the second operation unit SU can be configured using a lever, a button, a dial, or a combination thereof. In any case, the first operation unit MU outputs an operation command for upshifting or downshifting to the main gear-shifting apparatus 30, and the second operation unit SU outputs an operation command for upshifting or downshifting to the sub gear-shifting apparatus 31.

The operation commands output from the first operation unit MU and the second operation unit SU are input to a gear-shifting control unit 6. The gear-shifting control unit 6 outputs a gear-shifting control command to one or both of the main gear-shifting apparatus 30 and the sub gear-shifting apparatus 31 so that an appropriate vehicle gear ratio is created based on the input operation command. Note that in FIG. 1, the gear stage switching function of the gear-shifting control unit 6 is illustrated as being divided between a first travel control section 61 that generates a gear-shifting control command for performing only switching of the gear stage of the main gear-shifting apparatus, and a second travel control section 62 that generates the gear-shifting control command accompanied by switching of the gear stage of the sub gear-shifting apparatus.

The gear-shifting control unit 6 has a work traveling mode that is applied when the traveling work vehicle is to travel while working at a work site, and a road traveling mode that is applied when the traveling work vehicle is to travel at a relatively high speed on a road such as a public road. The gear stage switching control in the gear-shifting control unit 6 can be set such that it is different for each of the above-described two modes. The schematic diagram shown in FIG. 1 shows gear stage switching control in the work traveling mode.

As can be understood from FIG. 1, when input of an upshift command is received from the first operation unit MU, the gear stage of the main gear-shifting apparatus 30 is raised by one stage, and the gear stage of the sub gear-shifting apparatus 31 is maintained. In this case, if the gear stage of the main gear-shifting apparatus 30 before the operation is the highest gear stage (the nth gear stage in FIG. 1), the gear stage of the main gear-shifting apparatus 30 and the gear stage of the sub gear-shifting apparatus 31 are kept as-is, and the overall vehicle gear ratio does not change. In other words, upshifting according to which the gear stage of the sub gear-shifting apparatus 31 changes is not performed using an upshift command from the first operation unit MU. Similarly, when input of a downshift command is received from the first operation unit MU, the gear stage of the main gear-shifting apparatus 30 is lowered by one stage, and the gear stage of the sub gear-shifting apparatus 31 is maintained. In this case, if the gear stage of the main gear-shifting apparatus 30 before the operation is the lowest gear stage (the first gear stage in FIG. 1), the gear stage of the main gear-shifting apparatus 30 and the gear stage of the sub gear-shifting apparatus 31 are kept as-is, and the overall vehicle gear ratio does not change. That is to say, downshifting according to which the gear stage of the sub gear-shifting apparatus 31 changes is not performed using a downshift command from the first operation unit MU.

The second operation unit SU is used to switch the gear stage of the sub gear-shifting apparatus 31. When input of an upshift command is received from the second operation unit SU, the gear stage of the sub gear-shifting apparatus 31 is raised by one stage and the gear stage of the main gear-shifting apparatus 30 is switched to the lowest gear stage. In order words, the next-higher gear stage of the sub gear-shifting apparatus 31 and the first gear stage of the main gear-shifting apparatus 30 are combined using the upshift command from the second operation unit SU. This is performed in order to avoid a case in which the vehicle gear ratio changes significantly due to upshifting the sub gear-shifting apparatus 31. However, a gear stage configuration exists in which in the case where the sub gear-shifting apparatus 31 is upshifted when the gear stage of the main gear-shifting apparatus 30 is at the highest gear stage, the gear shift difference is slight even if the next-higher gear stage of the sub gear-shifting apparatus 31 and the first gear stage of the main gear-shifting apparatus 30 are combined. In the case of using such a configuration, the next-higher gear stage of the sub gear-shifting apparatus 31 and a gear stage that is at least one stage above the lowest gear stage of the main gear-shifting apparatus 30 (second stage in FIG. 1) are combined as an exception (shown in FIG. 1 with the dotted line moving from Bn to C2). Also, when the gear stage of the sub gear-shifting apparatus 31 is already the highest gear stage, the upshift command is ignored.

Similarly, when input of a downshift command is received from the second operation unit SU, the gear stage of the sub gear-shifting apparatus 31 is lowered by one stage and, in principle, the gear stage of the main gear-shifting apparatus 30 is switched to the highest gear stage. In order words, the previous gear stage of the sub gear-shifting apparatus 31 and the highest gear stage of the main gear-shifting apparatus 30 are combined using the downshift command from the second operation unit SU. This is performed in order to avoid a case in which the vehicle gear ratio changes significantly due to downshifting the sub gear-shifting apparatus 31. However, a gear stage configuration exists in which in the case where the sub gear-shifting apparatus 31 is downshifted when the gear stage of the main gear-shifting apparatus 30 is the lowest gear stage, the gear shift difference is slight even if the next-lower gear stage of the sub gear-shifting apparatus 31 and the highest gear stage of the main gear-shifting apparatus 30 are combined. In the case of using such a configuration, the previous gear stage of the sub gear-shifting apparatus 31 and a gear stage that is at least one stage lower than the highest gear stage of the main gear-shifting apparatus 30 are combined as an exception (shown in FIG. 1 using a dotted line moving from C1 to Bn−1). Also, when the gear stage of the sub gear-shifting apparatus 31 is already the lowest gear stage, the downshift command is ignored.

Note that with road traveling, the travel load is small and the traveling work vehicle itself has inertia, and therefore it is not likely that a temporary cutoff of power transmission that occurs during the gear stage switching of the sub gear-shifting apparatus 31 will cause a shock. For this reason, it is possible to use a configuration such that in the road traveling mode set during road traveling, the switching of the gear stage of the sub gear-shifting apparatus 31 occurs in response to a gear-shifting operation command from the first operation unit MU as an exception. For example, if an upshift command is output from the first operation unit MU when the main gear-shifting apparatus 30 is at a final gear stage, the gear stage of the sub gear-shifting apparatus 31 is switched one gear stage higher, and the main gear-shifting apparatus 30 is switched to the lowest gear stage (first gear stage) or a gear stage that is at least one stage above the lowest gear stage, although this is not shown in FIG. 1. Similarly, if a downshift command is output from the first operation unit MU when the main gear-shifting apparatus 30 is at the highest gear stage (nth gear stage), the gear stage of the sub gear-shifting apparatus 31 is switched one gear stage lower, and the main gear-shifting apparatus 30 is switched to the highest gear stage (nth gear stage) or a gear stage that is at least one stage below the highest gear stage (n−1th gear stage).

If there are more than 20 gear stages obtained by combining the main gear-shifting apparatus 30 and the sub gear-shifting apparatus 31, there are few cases where all of the gear stages are used in normal work traveling and road traveling. It is convenient to enable use of only gear stages that may be needed in the work traveling and road traveling that is to be performed in the future. Preferred embodiments for selecting only gear stages that belong within a desired gear-shifting range from all of the gear stages created by combining the main gear-shifting apparatus 30 and the sub gear-shifting apparatus 31 will be described with reference to FIG. 2. Note that in order to simplify the description, it is assumed here that the main gear-shifting apparatus 30 has four gear stages, namely first to fourth gear stages, and the sub gear-shifting apparatus 31 has six gear stages, namely A to F.

Figure 2:
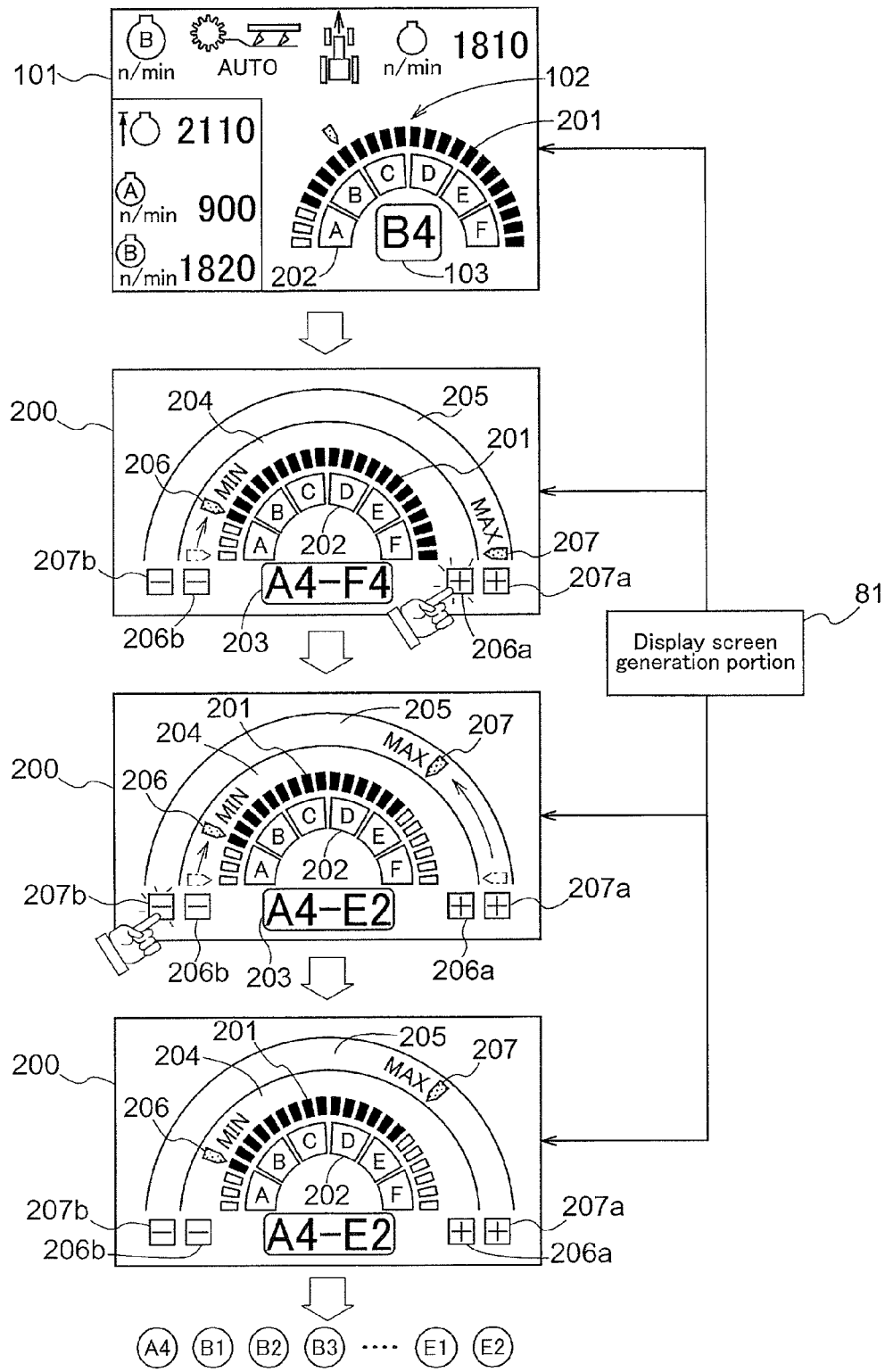
FIG. 2 is a schematic diagram for illustrating an example of a display screen for gear-shifting control according to the present invention.

In the gear stage selection, a display screen displayed on a display apparatus such as a liquid crystal panel mounted in the traveling work vehicle by a display screen generation section 81 plays an important role. The display screen includes a first display screen 101 and a second display screen 200. As shown in FIG. 2, the first display screen 101 is one reporting screen for reporting various types of information to a driver during traveling, and on which an engine rotation speed display region, a stored engine rotation speed display region, a driving direction (forward or reverse) display region, and the like are arranged, and in the lower right portion of the first display screen, a gear-shifting state display region 102 is arranged which shows the gear stage of the main gear-shifting apparatus 30 and the gear stage of the sub gear-shifting apparatus 31 that are currently selected.

The gear-shifting state display region 102 of the first display screen 101 includes a sub gear stage display region 202 that displays a group of gear stages of the sub gear-shifting apparatus 31, a main gear stage display region 201 that displays the gear stages of the main gear-shifting apparatus 30 such that they are allocated to the gear stages of the sub gear-shifting apparatus 31, and a usage gear stage display region 103 that displays the usage gear stage that is obtained by integrating the gear stage of the main gear-shifting apparatus 30 that is currently in use and the gear stage of the sub gear-shifting apparatus 31 that is currently in use, according to which the vehicle gear ratio is determined. The gear-shifting state display region 102 of the first display screen 101 is used as a base to generate a second display screen 200 to be used as a gear stage selection screen. Also, it is possible to transition from the first display screen 101 to the second display screen 200 by performing a predetermined operation. On the second display screen 200, the sub gear stage display region 202 and the main gear stage display region 201 are arranged, and a selected gear stage display region 203 that displays the gear stage selected in a gear stage selection task is arranged instead of the usage gear stage display region 103. Furthermore, a lower limit selection region 204 for selecting the combined gear stage of the main gear-shifting apparatus 30 and the sub gear-shifting apparatus 31 that defines the lower limit of the vehicle gear ratio, and an upper limit selection region 205 for selecting the combined gear stage of the main gear-shifting apparatus 30 and the sub gear-shifting apparatus 31 that defines the upper limit of the vehicle gear ratio are additionally arranged on the second display screen 200.

In the example shown in FIG. 2, the sub gear stage display region 202 and the main gear stage display region 201 are each formed in the mode of a semicircular arc-shaped bar graph centered about the approximate center of the selected gear stage display region 203. Accordingly, it is possible to define the combined gear stages of the main gear-shifting apparatus 30 and the sub gear-shifting apparatus 31 through lines that extend in radial directions and pass through the center of the semicircular arcs. Furthermore, the lower limit selection region 204 and the upper limit selection region 205 are also formed in the form of a semicircular arc-shaped bar graphs arranged coaxially. That is to say, the sub gear stage display region 202, the main gear stage display region 201, the lower limit selection region 204, and the upper limit selection region 205 are arranged on the same axis. The order of arrangement in the radial direction is arbitrary, but in the example illustrated in FIG. 2, the elements are aligned in the following order, moving toward the outer side in the radial direction: the sub gear stage display region 202, the main gear stage display region 201, the lower limit selection region 204, the upper limit selection region 205.

In the lower limit selection region 204, a lower limit setting indicator 206 that indicates the lower limit gear stage is arranged movably in the lower limit selection region 204, and in the upper limit selection region 205, an upper limit setting indicator 207 that indicates the upper limit gear stage is arranged movably in the upper limit selection region 205. In the example shown here, a plus button 206a and a minus button 206b for moving the lower limit indicator 206 and a plus button 207a and a minus button 207b for moving the upper limit indicator 207 are arranged as software buttons. Instead of these software buttons, it is possible to use a configuration in which the lower limit setting indicator 206 and the upper limit setting indicator 207 are moved directly by dragging, and it is possible to include hardware buttons. In any case, the combined gear stage for the main gear-shifting apparatus 30 and the sub gear-shifting apparatus 31 that is located on a line that extends in the radial direction and passes through the lower limit setting indicator 206 and the center of the semicircular arc is displayed as the lower limit gear stage on the left side of the selected gear stage display region 203. Also, the combined gear stage for the main gear-shifting apparatus 30 and the sub gear-shifting apparatus 31 that is located on a line that extends in the radial direction and passes through the upper limit setting indicator 207 and the center of the semicircular arc is displayed as the upper limit gear stage on the right side of the selected gear stage display region 203.

Accordingly, the combined gear stages for the main gear-shifting apparatus 30 and the sub gear-shifting apparatus 31, which are each realized by operation the first operation unit MU or the second operation unit SU, are limited to a gear-shifting range selected through the above-described gear stage selection processing.

Figure 3:
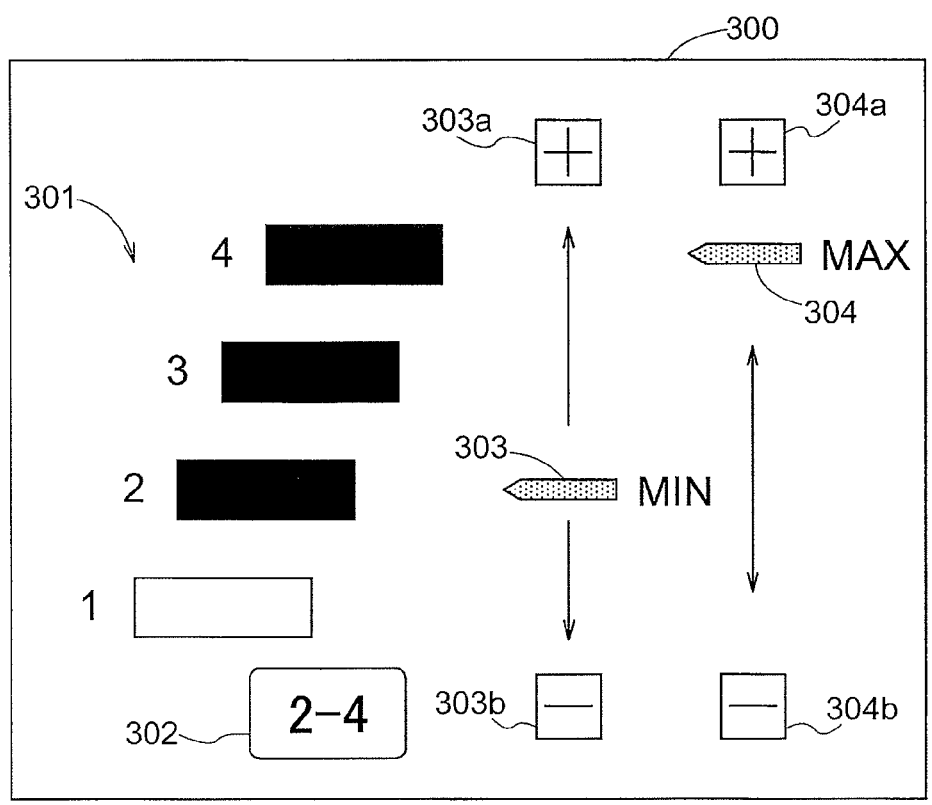
FIG. 3 is a schematic diagram for illustrating an example of a display screen for gear-shifting control according to the present invention.

Note that the main gear-shifting apparatus 30 can also be configured to be able to select the usage gear stage. The gear stage selection processing for the main gear-shifting apparatus 30 can be performed via a usage gear stage selection screen 300 for the main gear-shifting apparatus 30 such as that shown in FIG. 3, which is an example of a third display screen, for example. Note that in order to simplify the description here as well, it is assumed that the main gear-shifting apparatus 30 has four gear stages, namely first to fourth gear stages. Four horizontal bars 301 that show four gear stages are arranged on the left side of the usage gear stage selection screen 300, and a distinction is made between gear stages that are selected and gear stages that are not selected by using different colors or patterns to render the horizontal bars. A selected gear stage display field 302 in which the selected gear stages are displayed as numeric values in a manner such as "2-4" for example is arranged below the four horizontal bars 301. A lower limit setting indicator 303 that indicates the lower limit gear stage and an upper limit setting indicator 304 that indicates the upper limit gear stage are displayed in alignment on the left side of the usage gear stage selection screen 300. Here as well, a plus button 303a and minus button 303b for moving the lower limit setting indicator 303, and a plus button 304a and minus button 304b for moving the upper limit setting indicator 304 are arranged as software buttons. Instead of these software buttons, it is possible to use a configuration in which the lower limit setting indicator 303 and the upper limit setting indicator 304 are moved directly by dragging, and it is possible to include hardware buttons.

The selection of the usage gear stage described above can be set individually for the work traveling mode and the road traveling mode. If consideration is given to the fact that a narrow gear-shifting range is used in work traveling, and a wide gear-shifting range is used in road traveling, it is convenient to use a configuration in which the selection of the gear stage range for the main gear-shifting apparatus 30 using the third display screen is effective during the work traveling mode and the selection of the gear stages of the main gear-shifting apparatus 30 and the sub gear-shifting apparatus 31 using the second display screen is effective during the road traveling mode.

Figure 4:
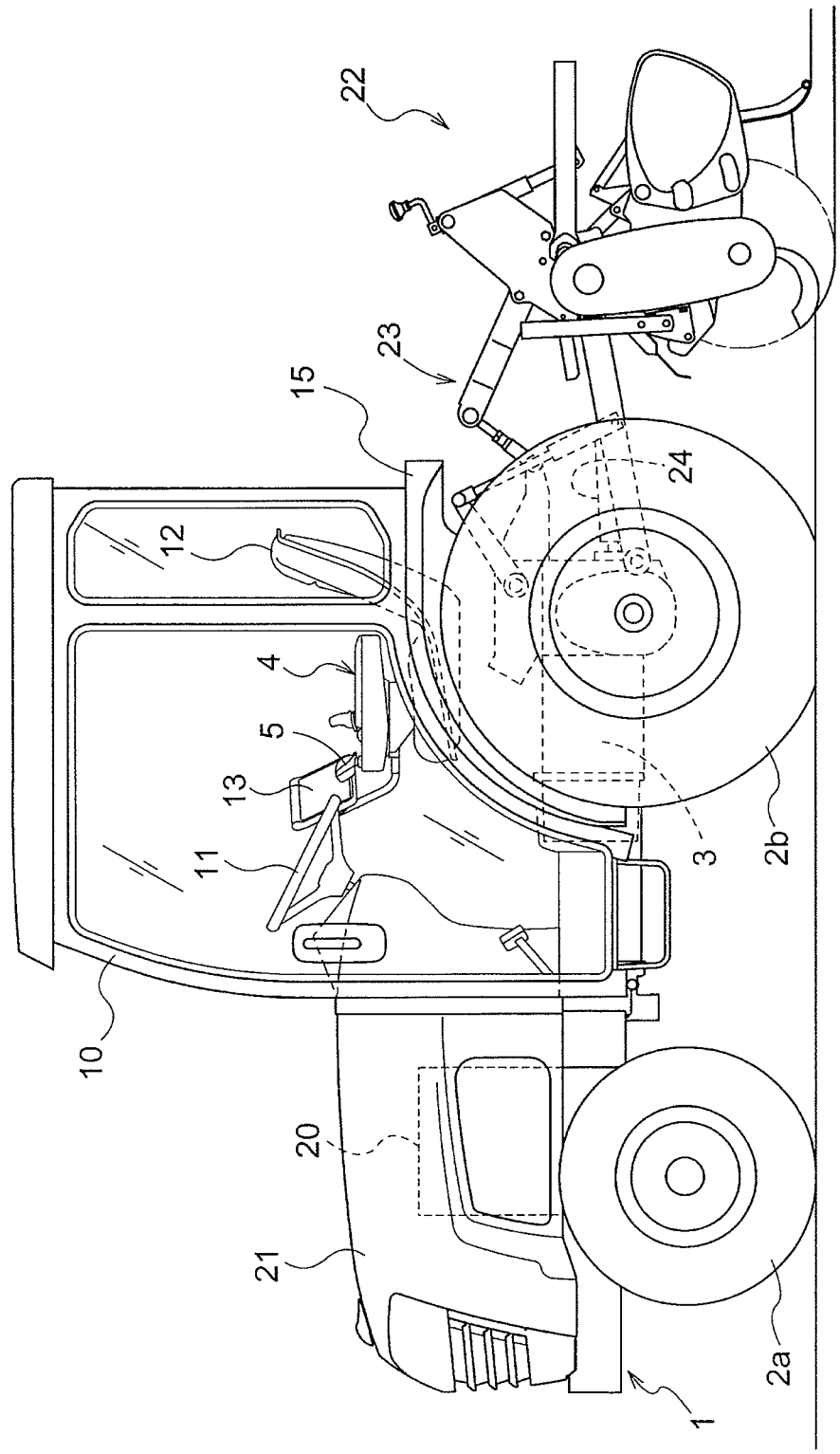
FIG. 4 is a side view of a tractor, which is one embodiment of a traveling work vehicle according to the present invention.

Next, one specific embodiment of the traveling work vehicle according to the present invention will be described. FIG. 4 is a side view of a tractor, which is an example of a traveling work vehicle. With this tractor, an engine 20 is mounted on the front portion of the tractor vehicle body 1 that is supported by front wheels 2a and rear wheels 2b, and a transmission 3 is mounted rearward of the engine 20. Toward the rear of the vehicle body 1, a rotary tilling apparatus is equipped as a work apparatus 22 so as to be able to move vertically via a link mechanism 23. The tractor has four-wheel drive, and the power of the engine 20 is transmitted via a gear-shifting apparatus included in the transmission 3 to the front wheels 2a and the rear wheels 2b, which can be configured as drive wheels. Furthermore, the power of the engine 20 is also transmitted to the work apparatus 22 via a PTO shaft 24 protruding rearward from the transmission 3. The engine 20 is covered by a hood 21. A cabin 10 is supported on the vehicle body 1 rearward of the hood 21 and above the transmission 3.

Figure 5:
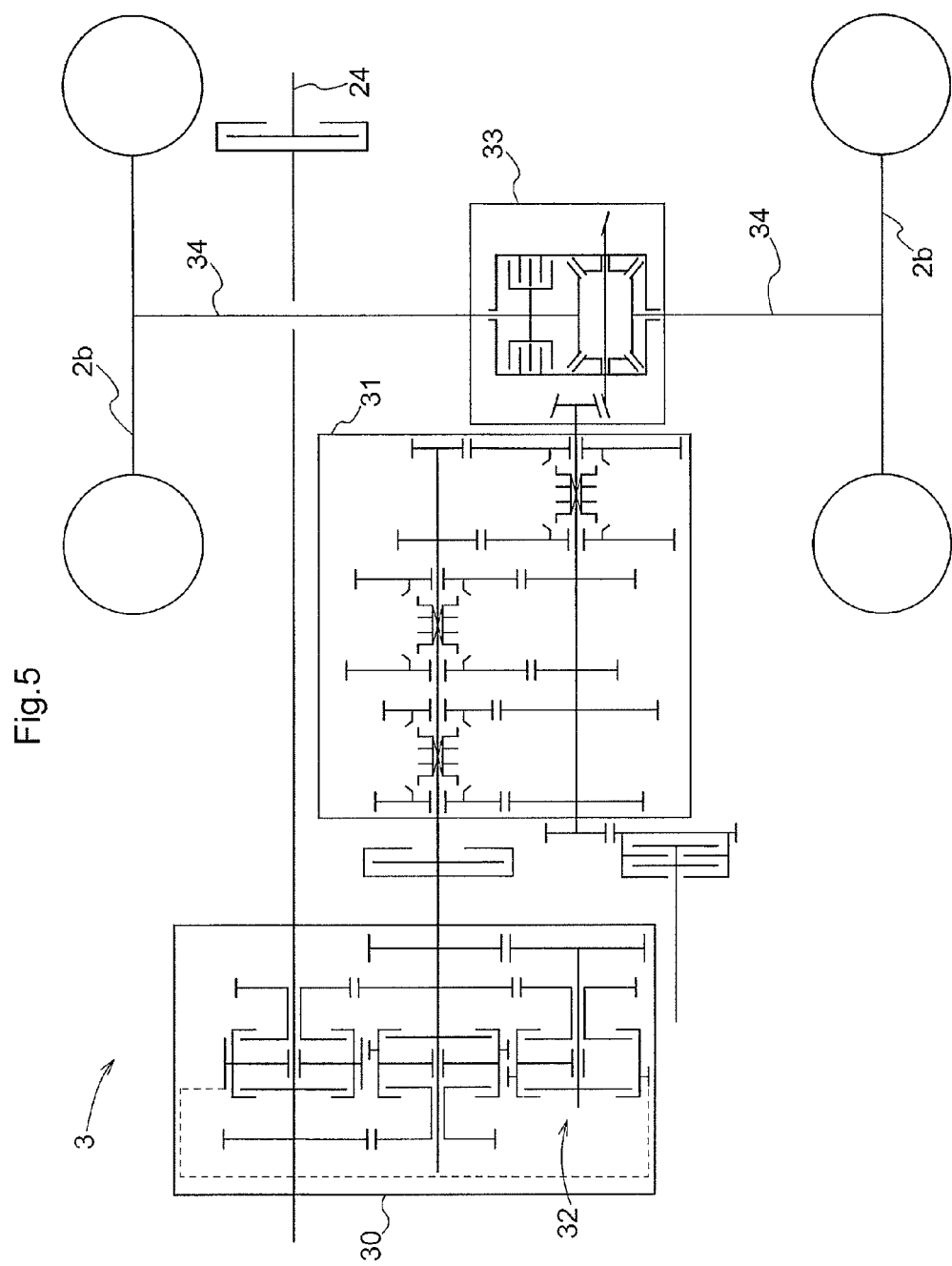
FIG. 5 is a schematic diagram of a transmission equipped in a tractor.

The transmission 3 in this embodiment includes the main gear-shifting apparatus 30 and the sub gear-shifting apparatus 31 as gear-shifting mechanisms, and a forward/reverse switching mechanism 32 is furthermore incorporated in the main gear-shifting apparatus 30, although this is merely shown schematically in FIG. 5. Converted power from the transmission 3 is transmitted to the rear wheels 2b via a differential apparatus 33 and a rear axle 34. The converted power from the transmission 3 can be transmitted to the front wheels 2a as well, although this is not shown in detail in the drawing. The main gear-shifting apparatus 30 is of a type that constantly uses interlocking gear sets and multiple clutches to perform switching between four gear stages, which is not accompanied by a cutoff of the power transmission. The sub gear-shifting apparatus 31 is of a so-called synchromesh type that performs switching between six gear stages, which is accompanied by a cutoff of the power transmission.

The interior of the cabin 10 functions as a driving space in which a steering wheel 11 for performing a steering operation of the front wheels 2a is arranged in the front portion thereof, and a driving seat 12 is arranged rearward of that between a pair of left and right rear wheel fenders 15. An armrest operation apparatus 4 having a multifunction operation tool 5 is provided from the rear to the front of the driving seat 12. A display 13 that visually reports various kinds of information to the driver is provided on the front of the armrest operation apparatus 4.

Figure 6:
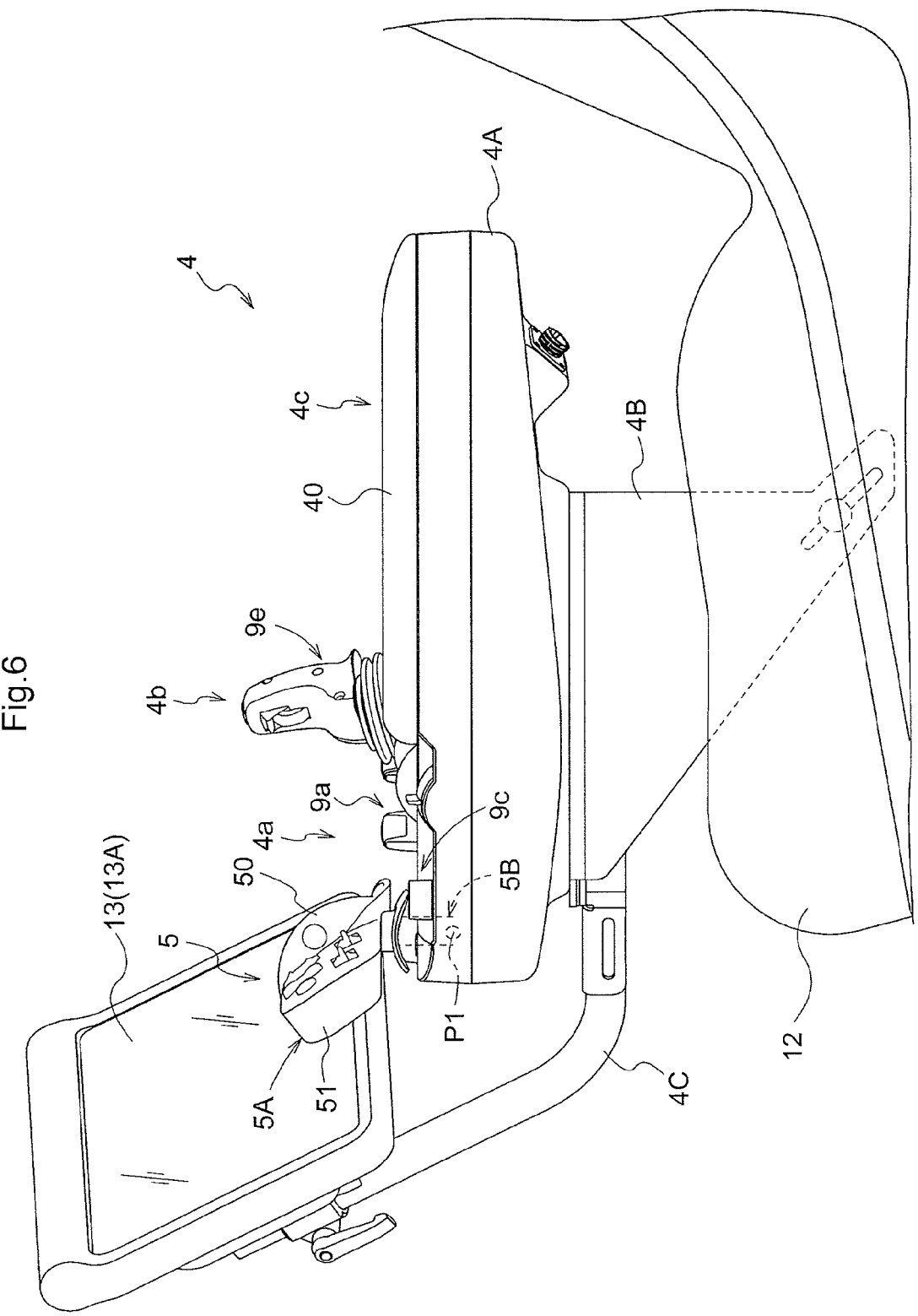
FIG. 6 is a side view of an armrest operation apparatus equipped in a tractor.
Figure 7:
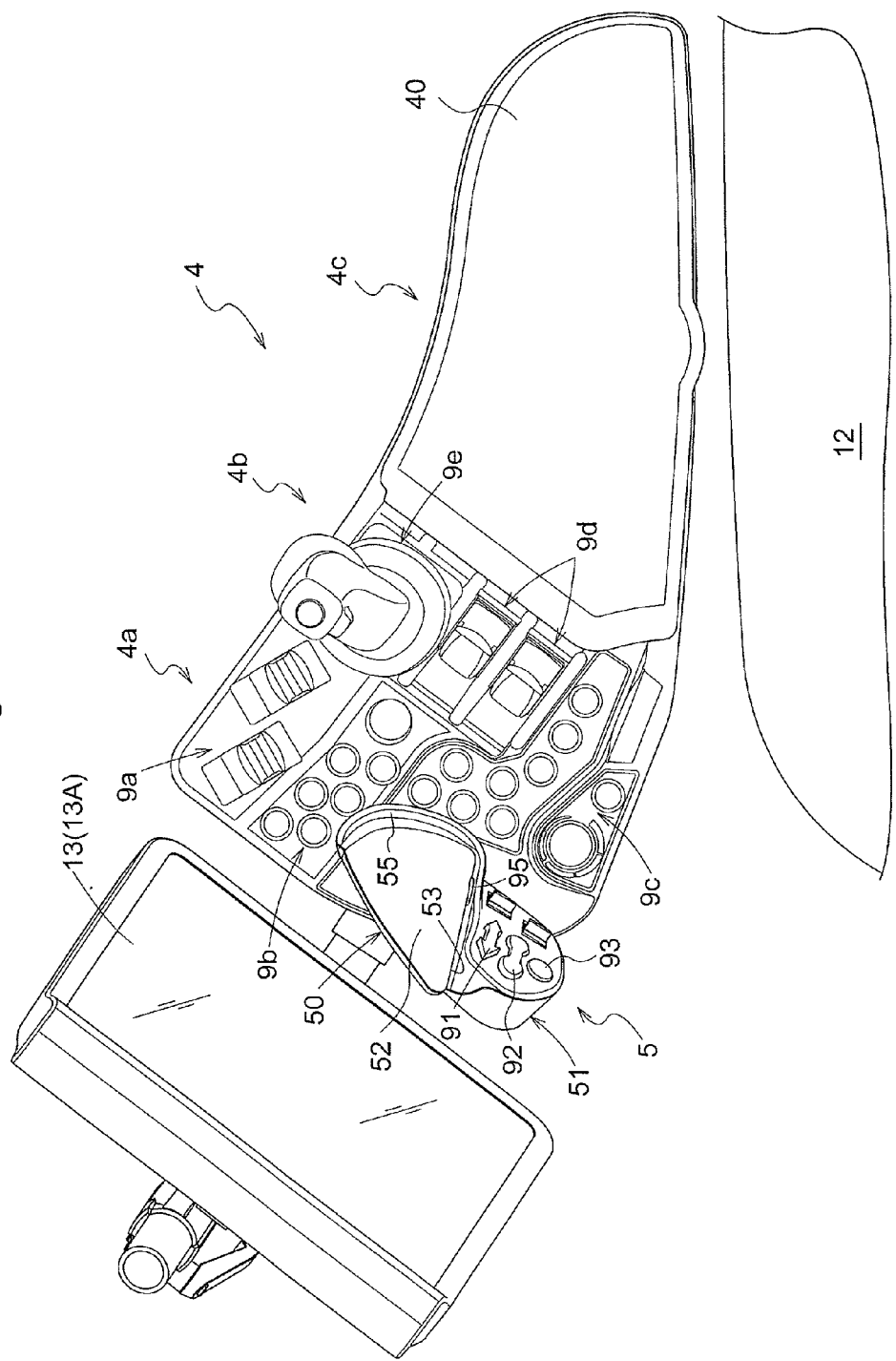
FIG. 7 is a plan view of the armrest operation apparatus.

As shown in FIGS. 6 and 7, the armrest operation apparatus 4 includes an armrest support platform 4A that is fixed to an attachment bracket 4B fixed to a support frame (not shown). A support rod 4C that inclines upward as it extends toward the front is fixed to the attachment bracket 4B, and the display 13, which is a liquid crystal panel or the like, is attached at the leading end portion of the support bracket 4C. The display 13 can receive an input operation via the touch panel 13A and can receive input of various operations by the driver.

As is evident from FIG. 6, the armrest operation apparatus 4 can be divided into a front region 4a, an intermediate region 4b, and a rear region 4c in plan view. An armrest platform 40 that has a cushioning property and on which an arm is rested is provided in the rear region 4c. The multifunction operation tool 5, which will be described in detail later, is provided in approximately the left half of the front region 4a. A first operation switch group 9a and a second operation switch group 9b are arranged as an operation switch group 9 in approximately the right half of the front region 4a. A third operation switch group 9c, a fourth operation switch group 9d, and a fifth operation switch group 9e are arranged starting from the left also in the intermediate region 4b as the operation switch group 9. Operation switches formed in various types, such as buttons, switches, dials, levers, and joysticks are provided in the operation switch group 9.

The multifunction operation tool 5, which is supported so as to be able to swing about a swing axis P1, is arranged in the front end region on the left side of the armrest platform 40. The multifunction operation tool 5 is used to control the traveling state of the tractor and the state of the work apparatus 22 equipped on the tractor. The multifunction operation tool 5 is substantially composed of a gripping body 5A and a swinging body 5B. As can be understood from FIG. 8, the swinging body 5B is formed as an arm member that swings about the swing axis P1. A configuration is used in which the vehicle is caused to upshift by swinging the swinging body 5B in a forward direction (P) from a swing-neutral position of the swinging body 5B, and the vehicle is caused to downshift by swinging the swinging body 5B in a rearward direction (D).

Figure 8:
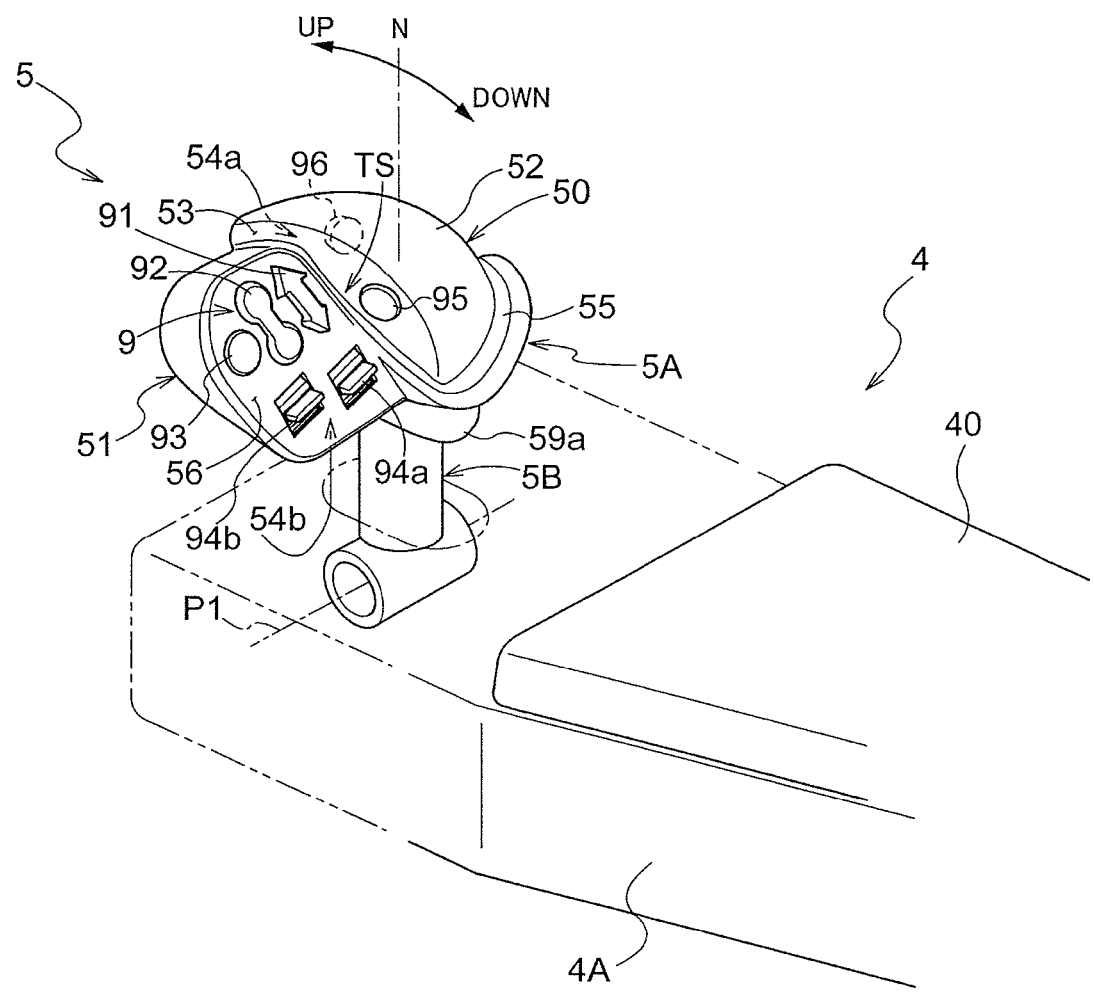
FIG. 8 is a perspective view of a multifunction operation tool provided on the armrest operation apparatus.

The gripping body 5A is provided on the free end side of the swinging body 5B. As shown in FIG. 8, the gripping body 5A is composed of a gripping portion 50 formed in the right side region, or here, in the approximate right half region of the gripping body 5A, and an extending portion 51 for the operation switch group 9, which is formed in the left side region, or here, in the approximate left half region of the gripping body 5A. The outer circumferential surface of the gripping body 5A is formed by a convex curved surface 52, a perpendicular side surface 53, a back surface 54a, and a bottom surface 54b. The convex curved surface 52 has a shape according to which the palm of a hand gripping the gripping portion 50 extends smoothly across the surface thereof. The perpendicular side surface 53 is a surface that extends such that it is almost perpendicular to the left edge of the convex curved surface 52. A tongue piece that protrudes outward is formed as a pinky finger pad rest 55 on at least a portion of the lower edge of the gripping portion 50, or in other words, the boundary region between the bottom surface 54b and the convex curved surface 52. The pinky finger pad rest 55 has a shape that holds the pinky finger pad of the hand resting on the gripping portion 50 such that the palm of the hand does not slide off downward.

The upper surface of the extending portion 51 has an approximately flat surface or a surface that is slightly curved outward. In practical application, the upper surface of the extended portion 51 is arranged so as to oppose the operator, and therefore it will hereinafter be referred to as "operator-opposing surface 56". The operator-opposing surface 56 of the extended portion 51 has a shape that extends leftward from the lower edge of the perpendicular side surface 53 of the gripping portion 50, the gripping portion 50 and the extended portion 51 are connected, and the operator-opposing surface 56 and the perpendicular side surface 53 intersect at an approximate right angle. Accordingly, the space bordered by the operator-opposing surface 56 and the perpendicular side surface 53 is wide enough such that the thumb of the hand resting on the gripping portion 50 can move freely to some extent. For this reason, this space will be referred to as "thumb free space TS".

The operation switches (including buttons, levers, and the like) that belong to the operation switch group 9 are arranged on the perpendicular side surface 53 and the operator-opposing surface 56. In this embodiment, the operator-opposing surface 56 is provided with a shuttle button 91 and a gear ratio fixing button 93 that belong to an operation switch group relating to travel, and an up/down button 92 and two hydraulic control switches 94a and 94b that belong to an operation switch group relating to work. The shuttle button 91 is arranged at the position that is closest to the perpendicular side surface 53 on the approximate upper half (front half) of the operator-opposing surface 56. The up/down button 92 is arranged to the left of the shuttle button 91, and the gear ratio fixing button 93 is arranged to the left of the shuttle button 91. The hydraulic control switches 94a and 94b are arranged side-by-side on the approximate lower half (front half) of the operator-opposing surface 56. Also, a gear shift auxiliary button 95 is arranged on the perpendicular side surface 53. Furthermore, a shuttle auxiliary button 96 is arranged on the back surface 54a of the gripping portion 50. The shuttle auxiliary button 96 can be easily operated using the index finger or middle finger of a hand whose palm is resting on the convex curved surface 52 of the gripping portion 50.

The forward/reverse switching mechanism 32 of the transmission 3 is switched to the forward state by pressing the shuttle auxiliary button 96 and pressing the location of the upward shuttle arrow of the shuttle button 91, and the forward/reverse switching mechanism 32 of the transmission 3 is switched to the reverse state by pressing the shuttle auxiliary button 96 and pressing the location of the downward shuttle arrow of the shuttle button 91.

A configuration is used in which, when switching the gear stage (shifting up, shifting down) using an operation of swinging about the swing axis P1 of the gripping portion 50, the switching operation of the gear stage of only the main gear-shifting apparatus 30, which is not accompanied by the switching of the sub gear-shifting apparatus 31, is available even if the gear shift auxiliary button 95 is not pressed, but the switching operation of the gear stage that is accompanied by the switching of the sub gear-shifting apparatus 31 is not available if the gear shift auxiliary button 95 is not pressed. In other words, in this embodiment, when the gear shift auxiliary button 95 is not pressed, the multifunction operation tool 5 functions as the first operation unit MU, and when the gear shift auxiliary button 95 is pressed, the multifunction operation tool 5 functions as the second operation unit SU.

Also, the transmission 3 is configured such that an appropriate gear ratio is set according to the vehicle speed. However, during work and the like, there are cases where it is preferable to keep the gear ratio as-is even if the vehicle speed temporarily varies. In order to resolve this problem, the gear ratio fixing button 93 is a button for mandatorily fixing the gear ratio, and by operating this button, the gear ratio of the transmission 3 will not change even if the vehicle speed decreases due to a brake operation or the like.

FIG. 9 shows gear stages before operation and gear stages after operation when an operation for upshifting (shifting up) or an operation for downshifting (shifting down) is performed using the multifunction operation tool 5. The gear stages of the main gear-shifting apparatus 30 are shown using numbers 1 to 4, and the gear stages of the sub gear-shifting apparatus 31 are shown using letters A to F. The gear stages resulting from gear-shifting operations are divided into gear stages resulting from shifting up or shifting down using the gripping portion 50 without pressing the gear shift auxiliary button 95 (main gear stage switching operation), and gear stages resulting from shifting down or shifting up using the gripping portion 50 while pressing the gear shift auxiliary button 95 (sub gear stage switching operation). The gear stages resulting from the main gear stage switching operation are divided by road traveling and work traveling. The results shown in FIG. 9 are based on the content described with reference to FIG. 1, and therefore the description thereof will not be repeated here.

Note that the gear stage switching table shown as a list in FIG. 9 shows all of the gear stages 1 to 4 of the main gear-shifting apparatus 30 and all of the gear stages A to F of the sub gear-shifting apparatus 31, but it is possible to select a range of available gear stages. Furthermore, it is also possible to select a range of gear stages that can be selected from the gear stages of the main gear-shifting apparatus 30.

Figure 10:
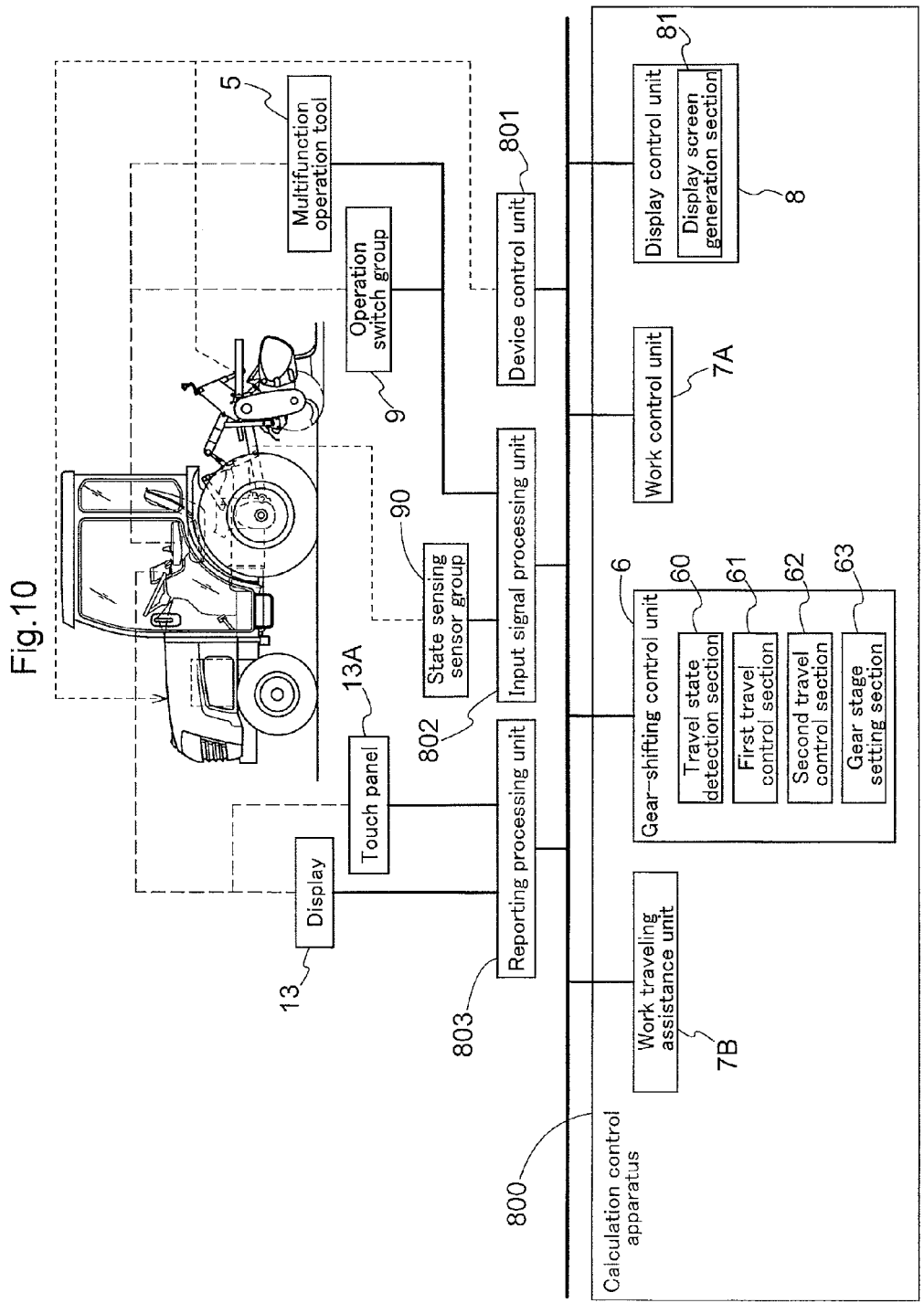
FIG. 10 is a functional block diagram showing functions relating in particular to the present invention in a control system equipped in the tractor.

In FIG. 10, the control system equipped in the tractor is shown in the form of a functional block diagram. In this control system, the functional sections that construct the functions realized mainly by a computer program are shown as a calculation control apparatus 800, but the division of these functions is merely for the purpose of description, and in the construction of the actual control system, the functions can be divided freely or integrated. The calculation control apparatus 800 is connected to other units so as to be able to transfer data thereto using a vehicle-mounted LAN or the like. Examples of such units include a device control unit 801, an input signal processing unit 802, a reporting processing unit 803, and the like. Also, in the interior of the calculation control apparatus 800 as well, the functional sections and functional units are connected so that data can be transferred therebetween via a vehicle-mounted LAN and another data transfer path.

The device control unit 801 provides an operation signal to various operation devices included in the engine 20, the transmission 3, and the work apparatus 22 so as to control the operations thereof. The input signal processing unit 802 has an input interface function according to which input of signals is received from the multifunction operation tool 5, the operation switch group 9, and a state sensing sensor group 90 including various sensors, and the signals are transferred to the functional sections of the control system. The reporting processing unit 803 has an input/output interface function according to which an image signal for the display 13, an audio signal for a speaker 14, or an operation input signal from the touch panel 13A is processed.

The calculation control apparatus 800 illustrated in FIG. 10 includes the gear-shifting control unit 6, a work control unit 7A, a work traveling assistance unit 7B, a display control unit 8, a work state determination section 60, and the like.

The gear-shifting control unit 6 outputs a gear-shifting control command to the main gear-shifting apparatus 30 and the sub gear-shifting apparatus 31 via the device control unit 801 to create a vehicle gear ratio according to the combination of the gear stages of the main gear-shifting apparatus and the sub gear-shifting apparatus. The gear-shifting control unit 6 includes the first travel control section 61, the second travel control section 62, and a gear stage setting section 63. In the work traveling mode, the first travel control section 61 generates a gear-shifting control command for performing only switching of the gear stage of the main gear-shifting apparatus 30 in response to the gear-shifting operation command generated using a swinging operation of the multifunction operation tool 5 in a state in which the gear shift auxiliary button 95 is not pressed. As described above, in the road traveling mode, there are cases involving switching of the gear stage of the sub gear-shifting apparatus 31 as an exception. The second travel control section 62 generates a gear-shifting control command that is accompanied by switching of the gear stage of the sub gear-shifting apparatus 31 in response to the gear-shifting operation command generated using a swinging operation of the multifunction operation tool 5 in a state in which the gear shift auxiliary button 95 is pressed. The gear stage setting section 63 sets available gear stages for the main gear-shifting apparatus 30 and the sub gear-shifting apparatus 31 via a process such as that described with reference to FIGS. 2 and 3.

The display control unit 8 constructs a gear shift display control apparatus in cooperation with the reporting processing unit 803 and the like, and includes the display screen generation portion 81 that generates a first display screen 101, a second display screen 200, and a third display screen 300 (usage gear stage selection screen). The description of the first display screen 101 and the second display screen 200 is as was previously described with reference to FIG. 2, and the third display screen (usage gear stage selection screen) 300 is as was previously described with reference to FIG. 3. Also, the gear-shifting range that was selected via the second display screen 200 and the third display screen 300 is provided to the gear-shifting control unit 6 and is used as a condition according to which the gear stages used in gear-shifting control are limited.

The travel state detection section 60 determines whether the current state is the work traveling state or the road traveling state based on a sensing signal from at least one state sensing sensor among the state sensing sensor group 90 that senses the state of the work vehicle, which is obtained via the input signal processing unit 802. If it is determined that the current state is the work traveling state, the work traveling mode is set in the gear-shifting control unit 6, and if it is determined that the current state is the road traveling state, the road traveling mode is set.

The work control unit 7A performs control of the work apparatus 22 based on signals and the like from the operation switch group 9 for work. Also, the work control unit 7A manages the upper limit setting for the work apparatus and the vertical movement speed of the work apparatus as well. The work traveling assistance unit 7B manages partial automation of work traveling, and reporting to the driver, such as warnings based on signals from the state sensing sensor group 90.

With work traveling, there is a large traveling load, and therefore even a momentary cutoff of the power transmission will be accompanied by a shock. However, with road traveling, the travel load is small and the traveling work vehicle has inertia as well, and therefore it is not likely that a momentary cutoff of the power transmission will cause a shock. Giving consideration to this fact, in one preferred embodiment, in a road traveling mode, the first travel control section is configured to generate a gear-shifting control command for performing switching of the gear stage of the main gear-shifting apparatus that is accompanied by switching of the gear stage of the sub gear-shifting apparatus, in response to a gear-shifting operation command from the first operation unit. By including gear stage switching for sub gear shifting, the gear-shifting range is expanded, and comfortable road traveling is possible.

Note that the gear-shifting range obtained by combining the main gear-shifting apparatus and the sub gear-shifting apparatus, which each have multiple gear stages, is large, and there are few cases where all of the gear stages are used in normal work traveling and road traveling. Also, conversely, the possibility of selecting multiple gear stages ends up making a gear-shifting operation difficult for the driver. By enabling use of only specific gear stages that may be necessary in work traveling and road traveling, the gear-shifting operation is simplified, which is convenient for the driver. For this reason, in one preferred embodiment, the gear-shifting control unit includes a gear stage setting section configured to set an available gear stage for the main gear-shifting apparatus and/or the sub gear-shifting apparatus, and the gear-shifting control unit generates the gear-shifting control command such that only the gear stage set by the gear stage setting section is used. In this case, since the travel speed and travel load are significantly different between work traveling and road traveling, the gear-shifting range that is needed is also different. If consideration is given to this fact, it is preferable that the available gear stage set by the gear stage setting section is set individually for the work traveling mode and the road traveling mode.

With a work vehicle such as a tractor, the traveling speed and traveling load are significantly different between work traveling and road traveling, and for that reason, the gear-shifting range that is needed is also different. For this reason, it is important that the gear-shifting control unit knows whether the traveling work vehicle is in the work traveling state or in the road traveling state. The simplest configuration for this purpose is one in which a manually-operated tool for selecting the work traveling state and the road traveling state is provided and operated by the driver. However, in order to avoid burdening the driver, in a preferred embodiment, a configuration is used in which the traveling work vehicle includes a travel state determination section configured to determine whether a current state is a work traveling state or a road traveling state based on a sensing signal from a state sensing sensor that senses a state of a work vehicle, and a work traveling mode is set if it is determined that the current state is the work traveling state, and a road traveling mode is set if it is determined that the current state is the road traveling state. For example, if the work apparatus is in a driving state, it can be determined that the current state is the work traveling state, and if the vehicle speed exceeds a predetermined speed, it can be determined that the current state is the road traveling state.

In one preferred embodiment, the traveling work vehicle includes a swinging-type multifunction lever provided with an operation switch as an operation input tool used in common for the first operation unit and the second operation unit, and based on a swinging displacement of the multifunction lever in a state in which the operation switch is not operated, a gear-shifting control command corresponding to a gear-shifting control command from the first operation unit is output, and based on a swinging displacement of the multifunction lever accompanied by an operation of the operation switch, a gear-shifting control command corresponding to a gear-shifting control command from the second operation unit is output. According to this configuration, when a swinging operation of the multifunction lever is performed, if the operation switch (a finger-operated button is appropriate) is not operated, the main gear-shifting apparatus is not shifted up or shifted down, and if the operation switch is operated, the sub gear-shifting apparatus is shifted up or shifted down, and thus operability for gear shifting is improved.

Conversely, a configuration may be used in which based on a swinging displacement of the multifunction lever in a state in which the operation switch is not operated, a gear-shifting control command corresponding to a gear-shifting control command from the second operation unit is output, and based on a swinging displacement of the multifunction lever accompanied by an operation of the operation switch, a gear-shifting control command corresponding to a gear-shifting control command from the first operation unit is output.

In one preferred embodiment, a display screen generation section configured to generate a first display screen and/or a second display screen is included. The first display screen includes a sub gear stage display region in which a group of sub gear stages is displayed, a main gear stage display region in which display is performed such that a group of main gear stages is allocated to the sub gear stages, and a usage gear stage display region in which a usage gear stage according to the combination of the main gear stage that is currently in use and the sub gear stage that is currently in use is displayed. The second display screen includes the sub gear stage display region, the main gear stage display region, a lower limit selection region for selecting the gear stage that defines a lower limit of the vehicle gear ratio, an upper limit selection region for selecting the gear stage that defines an upper limit of the vehicle gear ratio, and a selected gear stage display region that displays the gear stages for the selected upper and lower limits. According to this configuration, a sub gear stage display region in which a group of sub gear stages are displayed, a main gear stage display region in which display is performed such that the group of main gear stages is allocated, and a usage gear stage display region showing the main gear stage that is currently in use and the sub gear stage that is currently in use are arranged on the first display screen, which is focused on by the driver while traveling is in progress. Accordingly, the driver can easily make visual confirmation of the gear stages that are currently being used, while viewing the multiple main gear stages and the multiple sub gear stages. Accordingly, the driver can easily find out the position of the currently-used gear stage based on the lowest gear stage and the highest gear stage, and the driver can understand the appropriate gear stage that is to be selected next. Furthermore, with the gear-shifting apparatus to which the present invention is applied, the gear-shifting range that can be realized using a gear-shifting operation can be selected from a group of multiple gear stages (vehicle gear ratios) resulting from combining main gear stages of the main gear-shifting apparatus and sub gear stages of the sub gear-shifting apparatus, and this selection can be performed via the second display screen. That is to say, the gear stage that defines the lower limit of the vehicle gear ratio can be selected in the lower limit selection region and the gear stage that defines the upper limit of the vehicle gear ratio can be selected in the upper limit selection region. The sub gear stage display region and the main gear stage display region of the second display screen are displayed on the first display screen as well, and therefore an advantage is obtained in that it is easy for the driver to get used to.

On a small screen, as one display mode with a large amount of visibility, it is proposed that the sub gear stage display region and the main gear stage display region are formed in the mode of a semicircular arc-shaped bar graph. In particular, if the semicircular arc-shaped bar graph mode in which the sub gear stage display region is formed, and the main gear stage region are formed in the mode of semicircular arc-shaped bar graphs having the same axial center, there is an advantage in that the display space is more compact.

In the above-described embodiment, when the gear shift auxiliary button 95 was not pressed, the multifunction operation tool 5 functioned as the first operation unit MU, and when the gear shift auxiliary button 95 was pressed, the multifunction operation tool 5 functioned as the second operation unit SU. Alternatively, the multifunction operation tool 5 may function as the first operation unit MU when the gear shift auxiliary button 95 is pressed, and the multifunction operation tool 5 may function as the second operation unit SU when the gear shift auxiliary button 95 is not pressed. Furthermore, one of the first operation unit MU and the second operation unit SU may be configured as a swinging lever, and the other may be configured as a button or a dial. In such a case, providing the button or dial on the swinging lever will improve operability.

A configuration may be used in which a range of available gear stages set by the gear stage setting section 63 is registered in advance, and the driver selects from the registered range of multiple gear stages. Also, a configuration may be used in which the gear stage setting section 63 automatically performs selection according to the state of the traveling work vehicle.

The functional blocks shown in FIG. 10 have only been illustrated for the purpose of description, and the functional units thereof can be arbitrarily integrated or arbitrarily divided. In particular, the functional sections constructed in the calculation control apparatus 800 are coordinated with each other using software, and therefore, in actuality, the functions thereof overlap in many cases. The functional sections shown in FIG. 10 are merely shown schematically, and here, there is no limitation to the division of the functions.

The traveling work vehicle according to the present invention can be applied not only to tractors, but also to agricultural work vehicles such as rice planters and combines, and to construction work vehicles such as front loaders, and the like.

What is claimed is:

1. A traveling work vehicle comprising:
a main gear-shifting apparatus configured to perform gear stage switching that is not accompanied by a cutoff of power transmission;
a sub gear-shifting apparatus configured to perform gear stage switching that is accompanied by the cutoff power transmission;
a gear-shifting control unit configured to output a gear-shifting control command to the main gear-shifting apparatus and the sub gear-shifting apparatus so as to create a vehicle gear ratio according to a combination of gear stages of the main gear-shifting apparatus and the sub gear-shifting apparatus; and
a first operation unit and a second operation unit configured to provide a first gear-shifting operation command for upshifting and a second gear-shifting operation command for downshifting to the gear-shifting control unit,
the gear-shifting control unit including
a first travel control section configured to, in a work traveling mode, generate the gear-shifting control command for performing only switching of the gear stage of the main gear-shifting apparatus in response to the first gear-shifting operation command from the first operation unit, and
a second travel control section configured to generate the gear-shifting control command accompanied by switching of the gear stage of the sub gear-shifting apparatus in response to a gear-shifting operation command from the second operation unit.

2. The traveling work vehicle according to claim 1, wherein
in a road traveling mode, the first travel control section generates the gear-shifting control command for performing switching of the gear stage of the main gear-shifting apparatus that is accompanied by switching of the gear stage of the sub gear-shifting apparatus, in response to the first gear-shifting operation command from the first operation unit.

3. The traveling work vehicle according to claim 1, wherein
the traveling work vehicle includes a travel state determination section configured to determine whether a current state is a work traveling state or a road traveling state based on a sensing signal from a state sensing sensor that senses a state of a work vehicle, and the work traveling mode is set if it is determined that the current state is the work traveling state, and a road traveling mode is set if it is determined that the current state is the road traveling state.

4. The traveling work vehicle according to claim 2, wherein
the traveling work vehicle includes a travel state determination section configured to determine whether a current state is a work traveling state or a road traveling state based on a sensing signal from a state sensing sensor that senses a state of the work vehicle, and the work traveling mode is set if it is determined that the current state is the work traveling state, and a road traveling mode is set if it is determined that the current state is the road traveling state.

5. The traveling work vehicle according to claim 1, wherein
the gear-shifting control unit includes a gear stage setting section configured to set an available gear stage for the main gear-shifting apparatus or the sub gear-shifting apparatus, and the gear-shifting control unit generates the gear-shifting control command such that only the gear stage set by the gear stage setting unit is used.

6. The traveling work vehicle according to claim 5, wherein
the available gear stage set by the gear stage setting unit is set individually for the work traveling mode and a road traveling mode.

7. The traveling work vehicle according to claim 2, wherein
the gear-shifting control unit includes a gear stage setting section configured to set an available gear stage for the main gear-shifting apparatus or the sub gear-shifting apparatus, and the gear-shifting control unit generates the gear-shifting control command such that only the gear stage set by the gear stage setting unit is used.

8. The traveling work vehicle according to claim 7, wherein
the available gear stage set by the gear stage setting unit is set individually for the work traveling mode and a road traveling mode.

9. The traveling work vehicle according to claim 1, wherein
the traveling work vehicle includes a travel state determination section configured to determine whether a current state is a work traveling state or a road traveling state based on a sensing signal from a state sensing sensor that senses a state of a work vehicle, and the work traveling mode is set if it is determined that the current state is the work traveling state, and a road traveling mode is set if it is determined that the current state is the road traveling state.

10. The traveling work vehicle according to claim 1, wherein
the traveling work vehicle includes a swinging-type multifunction lever provided with an operation switch as an operation input tool used in common for the first operation unit and the second operation unit, and
based on a swinging displacement of the multifunction lever in a state in which the operation switch is not operated, the gear-shifting control command corresponding to the gear-shifting control command from the first operation unit is output, and based on a swinging displacement of the multifunction lever accompanied by an operation of the operation switch, a gear-shifting control command corresponding to the gear-shifting control command from the second operation unit is output.

11. The traveling work vehicle according to claim 10, wherein
the multifunction lever includes a grip on which a palm of a hand is rested, and the operation switch is a finger-operated switch that is operated by a finger of the hand resting on the grip.

12. The traveling work vehicle according to claim 1, further comprising:
a display screen generation section configured to generate a first display screen and a second display screen,
wherein the first display screen includes a sub gear stage display region in which a group of sub gear stages is displayed, a main gear stage display region in which display is performed such that a group of main gear stages is allocated to the sub gear stages, and a usage gear stage display region in which a usage gear stage according to the combination of the main gear stage that is currently in use and the sub gear stage that is currently in use is displayed, and
wherein the second display screen includes the sub gear stage display region, the main gear stage display region, a lower limit selection region for selecting the gear stage that defines a lower limit of the vehicle gear ratio, an upper limit selection region for selecting the gear stage that defines an upper limit of the vehicle gear ratio, and a selected gear stage display region that displays the gear stages for the selected upper and lower limits.

13. The traveling work vehicle according to claim 12, wherein
the sub gear stage display region and the main gear stage display region are formed in the mode of a semicircular arc-shaped bar graph.

14. The traveling work vehicle according to claim 9, wherein
the semicircular arc-shaped bar graph mode in which the sub gear stage display region is formed, and the main gear stage region are formed in the mode of semicircular arc-shaped bar graphs having the same axial center.

* * * * *